United States Patent

Fletcher et al.

(10) Patent No.: US 10,520,970 B2
(45) Date of Patent: Dec. 31, 2019

(54) MULTI-PHASE CURRENT MODE CONTROL LOOP INCORPORATING A DISTRIBUTED TRANSCONDUCTANCE STAGE

(71) Applicant: Apple Inc., Cupertino, CA (US)

(72) Inventors: Jay B. Fletcher, Austin, TX (US);
Shawn Searles, Austin, TX (US);
Fabio Gozzini, San Jose, CA (US);
Sanjay Pant, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/870,661

(22) Filed: Sep. 30, 2015

(65) Prior Publication Data

US 2017/0090501 A1 Mar. 30, 2017

(51) Int. Cl.
*H02M 3/158* (2006.01)
*G05F 3/08* (2006.01)
*H02M 1/00* (2006.01)

(52) U.S. Cl.
CPC ............ *G05F 3/08* (2013.01); *H02M 3/1584* (2013.01); *H02M 2001/0003* (2013.01); *H02M 2001/0009* (2013.01); *H02M 2003/1586* (2013.01)

(58) Field of Classification Search
CPC . H02M 2001/0003; H02M 2001/0009; H02M 2001/0054; H02M 2001/007; H02M 2001/0074; H02M 2001/0077; H02M 2001/008; H02M 3/3374; H02M 3/156; H02M 3/157; H02M 3/158; H02M 3/1582; H02M 3/1584
See application file for complete search history.

(56) References Cited

U.S. PATENT DOCUMENTS

| 5,481,178 A * | 1/1996 | Wilcox ................. H02M 3/156 323/224 |
| 6,144,194 A | 11/2000 | Varga |
| 6,448,746 B1 | 9/2002 | Carlson |
| 7,046,533 B2 * | 5/2006 | Takemura ........... H02M 3/1584 363/65 |
| RE39,976 E | 1/2008 | Schiff et al. |
| 2007/0262759 A1 | 11/2007 | Burton et al. |
| 2009/0271649 A1 | 10/2009 | Loffink et al. |

(Continued)

FOREIGN PATENT DOCUMENTS

CN 105684289 6/2016

OTHER PUBLICATIONS

International Search Report and Written Opinion in application No. PCT/US2016/049281 dated Dec. 5, 2016, 12 pages.

(Continued)

*Primary Examiner* — Yusef A Ahmed
*Assistant Examiner* — Shahzeb K Ahmad
(74) *Attorney, Agent, or Firm* — Meyertons, Hood, Kivlin, Kowert & Goetzel, P.C.

(57) ABSTRACT

A system that includes a regulator unit is disclosed. The regulator unit includes first and second phase units whose outputs are coupled to a common output node. Each of the phase units may be configured to source current to the output node in response to the assertion of a respective clock signal in order to generate a regulated supply voltage. Each phase unit includes a respective transconductance amplifier configured to generate a respective demand current dependent upon a reference voltage and the regulated supply voltage.

17 Claims, 4 Drawing Sheets

(56) References Cited

U.S. PATENT DOCUMENTS

| | | | |
|---|---|---|---|
| 2010/0208789 A1 | 8/2010 | Cooke | |
| 2011/0018513 A1* | 1/2011 | Noda | H02M 3/158 |
| | | | 323/282 |
| 2011/0169327 A1 | 7/2011 | Bonnet | |
| 2012/0286750 A1* | 11/2012 | Xu | H02M 3/156 |
| | | | 323/282 |
| 2016/0049859 A1* | 2/2016 | de Cremoux | H02M 1/08 |
| | | | 323/282 |
| 2016/0241126 A1* | 8/2016 | Vaidya | H02M 3/158 |
| 2016/0301303 A1* | 10/2016 | Bari | H02M 3/156 |

OTHER PUBLICATIONS

International Preliminary Report in Application No. PCT/US2016/049281 dated Apr. 3, 2018, 7 pages.
Notification in Application No. 201680050099.3 dated Jul. 2, 2019, 9 pages.

\* cited by examiner

MULTI-PHASE CURRENT MODE CONTROL LOOP INCORPORATING A DISTRIBUTED TRANSCONDUCTANCE STAGE

BACKGROUND

Technical Field

Embodiments described herein relate to integrated circuits, and more particularly, to techniques for generating regulate power supply voltages.

Description of the Related Art

A variety of electronic devices are now in daily use with consumers. Particularly, mobile devices have become ubiquitous. Mobile devices may include cell phones, personal digital assistants (PDAs), smart phones that combine phone functionality and other computing functionality such as various PDA functionality and/or general application support, tablets, laptops, net tops, smart watches, wearable electronics, etc.

Such mobile devices may include multiple integrated circuits, each performing different tasks. In some cases, circuits that perform different tasks may be integrated into a single integrated forming a system on a chip (SoC). The different functional units within a SoC may operate at different power supply voltage levels. In some designs, power supply or regulator circuits may be included in, or external to, the SoC to generate different voltage levels for the myriad functional units included in the SoC.

Regulator circuits may include one or more reactive circuit components. For example, individual regulator sub-assemblies may employ a combination of inductors or capacitors. The reactive circuit components may be fabricated on an integrated circuit with the regulator circuits, or they may be included as discrete components in a semiconductor package or circuit board.

SUMMARY OF THE EMBODIMENTS

Various embodiments of a system including an integrated circuit die and decoupling unit are disclosed. Broadly speaking, a system is contemplated in which a first phase unit and second phase unit are each configured to generate a regulated supply voltage dependent upon respective first and second clock signals. The first phase unit may include a first transconductance amplifier and the second phase unit may include a second transconductance amplifier. The first transconductance amplifier may be configured to generate a first current dependent upon a reference voltage and the regulated supply voltage. The second transconductance amplifier may be configured to generate a second current dependent upon the reference voltage and the regulated supply voltage.

In one embodiment, the first phase unit may be further configured to compare the first demand current to a first sense current. The first sense current may correspond to a current sourced to a first inductor included in the first phase unit. Additionally, the second phase unit may be further configured to compare the second demand current to a second sense current. The second sense current may correspond to a current sourced to a second inductor included in the second phase unit.

In a further embodiment, the first phase unit may include a first driver circuit configured to source current to the first inductor dependent upon the first clock signal. The first driver circuit may be further configured to sink current from the first inductor dependent upon a comparison of the first demand current and the first source current.

BRIEF DESCRIPTION OF THE DRAWINGS

The following detailed description makes reference to the accompanying drawings, which are now briefly described.

Figure 1:
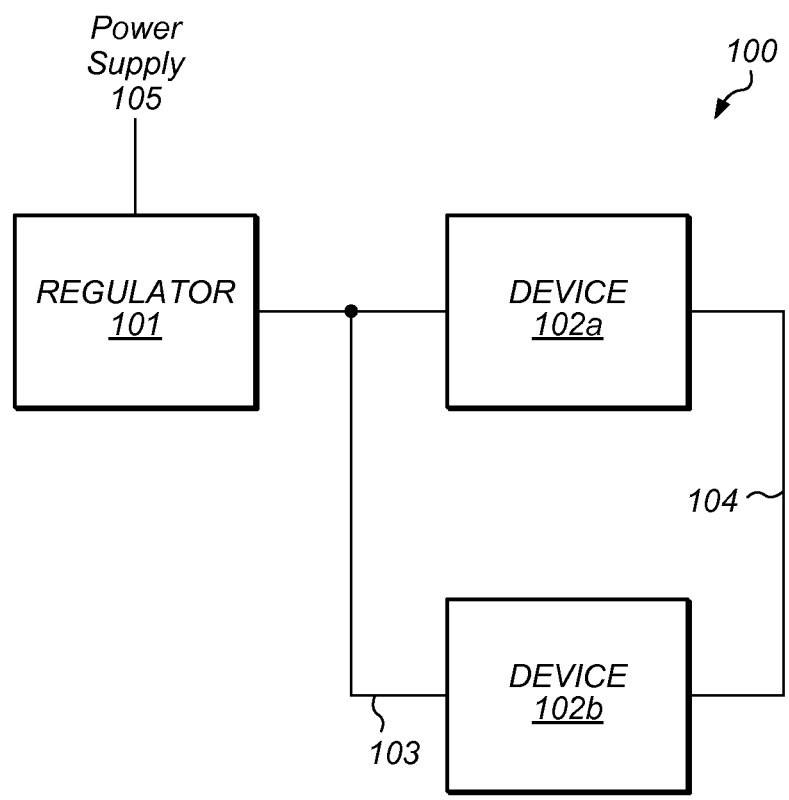
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Computing systems may include multiple functional units or devices. These device may be mounted together in a common integrated circuit package, or circuit board. Some computing systems may include multiple functional units on a single integrated circuit, commonly referred to as a "System-on-a-chip" or "SoC." Each functional unit or device within a computing system, may operate at a different voltage levels, which may be different than a voltage level of a master power supply of the power supply. In order to generate the desired voltage levels, one or more regulator units may be employed.

In some computing systems, DC-DC switching regulators are used to generate the desired voltage levels. Switching regulators rapidly switch a series of devices on and off in order to transfer charge to a load through an inductor, such as one of the aforementioned functional units or devices. By adjusting the duration of the time individual devices are switched on, the voltage level at the load may be kept within a predetermined range of a desired value.

Some switching regulators employ multiple phase units, each of which is active for a period of time while the remaining phase units are inactive. Each phase unit may be located in various locations within an integrated circuit, SoC, or even within a semiconductor package. Such phase units may employ local inner control loops that lock the inductor current to a demand current generated by a transconductance amplifier based on a voltage level at the output of the regulator. The use a single transconductance amplifier involves routing a wire for the demand current to all of the individual phase units. Such routing may allow other signals to couple into the wire, resulting in noise in the demand current, thereby reducing the performance of the regulator. The embodiments illustrated in the drawings and described below may provide techniques for using multiple phase units in a regulator unit while maintaining desired performance levels.

A block diagram of a computing system including multiple devices or functional units is illustrated in FIG. 1. In the illustrated embodiment, computing system 100 includes regulator unit 101, and devices 102a and 102b. Regulator unit 101 is coupled to power supply 105, and regulated power supply 103. Devices 102a and 102b are also coupled to regulated power supply 103. Additionally, device 102a is coupled to device 102b via communication bus 104.

As described below in more detail, regulator 101 may, in various embodiments, be configured to generate regulated power supply 103 using power supply 105. A voltage level of regulated power supply 103 may be less than, equal to, or greater than a voltage level of power supply 105 dependent upon the needs of devices 102a and 102b. Although only a single regulated power supply is depicted in the embodiment illustrated in FIG. 1, in other embodiments, multiple regulated power supplies may be employed. In such cases, different devices may be coupled different regulated power supplies. Alternatively, a single device may be coupled to multiple regulated power supplies.

In the illustrated embodiment, either of devices 102a or 102b may include a processor, processor complex, or a memory. In some embodiments, devices 102a and 102b may include Input/Output (I/O) circuits or analog/mixed-signal circuits. In various embodiments, computing 100 may be configured for use in a desktop computer, server, or in a mobile computing application such as, e.g., a tablet or laptop computer. It is noted that although FIG. 1 illustrates only two devices, in other embodiments, any suitable number of devices may be employed. Additional communication busses may also be employed to connect the various devices.

As used and described herein, a processor or processor complex having one or more processors or processor cores may, in various embodiments, be representative of a general-purpose processor that performs computational operations. For example, a processor may be a central processing unit (CPU) such as a microprocessor, a microcontroller, an application-specific integrated circuit (ASIC), or a field-programmable gate array (FPGA).

In the present disclosure, a memory describe any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example.

Analog/mixed-signal circuits may include a variety of circuits including, for example, a crystal oscillator, a phase-locked loop (PLL), an analog-to-digital converter (ADC), and a digital-to-analog converter (DAC) (all not shown). In other embodiments, analog/mixed-signal circuits included in one of devices 102a or 102b may include, radio frequency (RF) circuits that may be configured for operation with wireless networks.

As used herein, I/O circuits may be configured to coordinate data transfer between computing system 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O circuits may be configured to implement a version of Universal Serial Bus (USB) protocol, IEEE 1394 (Firewire®) protocol, or an Ethernet (IEEE 802.3) networking standard such as Gigabit Ethernet or 10-Gigabit Ethernet.

In some embodiments, each of the aforementioned devices may include multiple circuits, each of which may include multiple devices, such as, e.g., metal-oxide semiconductor field-effect transistors (MOSFETs) connected via multiple wires fabricated on multiple conductive layers. The conductive layers may be interspersed with insulating layers, such as, silicon dioxide, for example. Each circuit may also contain wiring, fabricated on the conductive layers, designated for a power supply net or a ground supply net.

Each of regulator 101 and devices 102a and 102b may, in various embodiments, be fabricated on a silicon wafer (or simply "wafer") along with numerous identical copies of regulator 101 and devices 102a and 102b, each of which may be referred to as a "chip" or "die." During manufacture, various manufacturing steps may be performed on each chip in parallel. Once the manufacturing process has been completed, the individual chips may be removed from the wafer by cutting or slicing through unused areas between each chip.

In other embodiments, regulator 101 may be fabricated on a separate chip than devices 102a and 102b. In such cases, regulator 101 and devices 102a and 102b may be coupled together inside a semiconductor package. Alternatively, regulator 101 and devices 102a and 102b may be mounted on a common circuit board or other suitable substrate. In such cases, wiring for regulated power supply 103 and communication bus 104 may include multiple metal layers fabricated into the package or circuit board.

Figure 2:
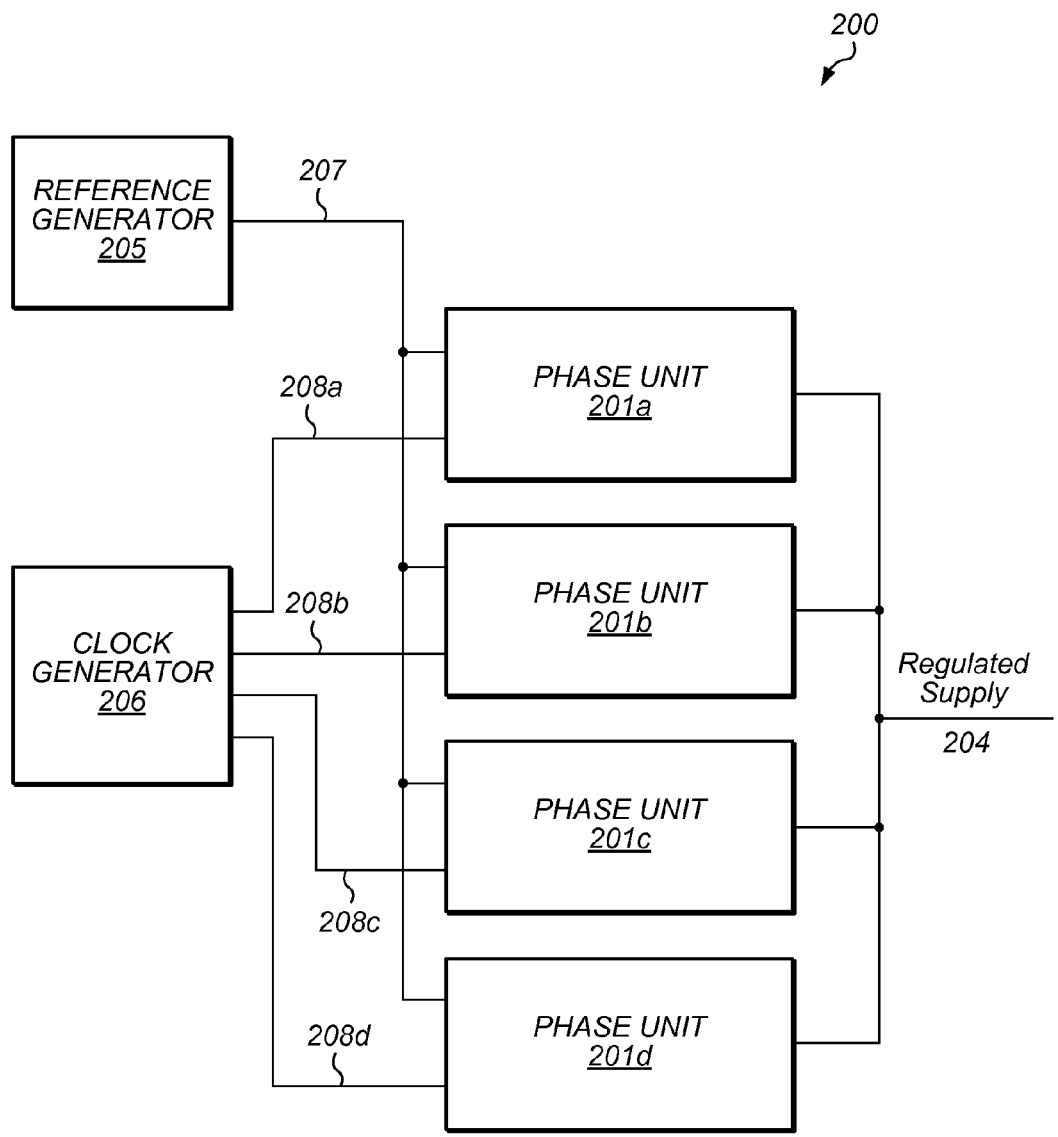
FIG. 2 illustrates an embodiment of a regulator unit.

Turning now to FIG. 2, an embodiment of a regulator unit is illustrated. Regulator unit 200 may, in various embodiments, correspond to regulator unit 101 as depicted in FIG. 1. In the illustrated embodiment, regulator unit 200 includes phase units 201a-d, reference generator 205, and clock generator 206.

Each of phase units 201a-d may be configured to supply current to regulated supply 204 dependent upon reference voltage 207 and a respective one of clock signals 208a-d. As described below in more detail, each phase unit of phase units 201a-d may include, at least, a transconductance amplifier, a comparator, a driver circuit, an inductor, and a latch. In various embodiments, difference circuit elements and sub-assemblies may be used to implement the desired functionality of a given phase unit of phase units 201a-d. It is noted that although four phase units are depicted in FIG. 2, in other embodiments, any suitable number of phase units may be employed.

During operation, as each of clocks signals 208a-d assert, a corresponding one of phase units 201a-d may source current through a respective inductor to regulated supply 204. A given phase unit of phase units 201a-d may be configured to monitor the current being sourced to regulated supply 204, and the sourced current may then be compared to a demand current generated locally in the given phase unit by the included transconductance amplifier. With each phase unit including a separate transconductance amplifier, less noise may be coupled into the demand current circuit node, thereby improving performance of the regulator unit.

Each phase unit may source current in sequence, with each phase unit sourcing a portion of the overall current to regulated supply 204. As the current demands on regulated supply 204 increase or decrease during operation of the computing system, an amount of current provided by an active phase unit may vary in order to maintain regulated supply 204 at a desired voltage level.

Reference generator may be configured to generate a predetermined voltage level (also referred to herein as a "reference voltage level") for reference voltage 207. The reference voltage level may, in various embodiments, be adjustable upon completion of a manufacturing process. Alternatively, or additionally, the reference voltage level may be adjustable during operation by the programming of one or more registers (not shown) in response to changes in operating mode of a computing system, or in response to the execution of one or more software instructions by a processor included in the computing system.

In various embodiments, reference generator may include a band gap reference circuit, or other suitable reference circuit, for generating a temperature and/or power supply independent reference voltage. Reference generator may also include one or more current mirrors, amplifiers, or other suitable analog circuitry necessary to adjust an initially generated voltage level to a desired level.

Clock generator 206 may be configured to generate clock signals 208a-d. In various embodiments, a phase of a given one of clock signals 208a-d may be separated by a predetermined phase angle from a proceeding one of clock signals 208a-d. In other words, an assertion of a given clock signal is delayed by a predetermined delay from the assertion of a proceeding clock signal. Each of clock signals 208a-d is coupled to a respective on of phase units 201a-d. It is noted that although four clocks signals are depicted in the embodiment illustrated in FIG. 2, in other embodiments, any suitable number of clocks signals may be employed.

In various embodiments, clock generator 206 may include a phase-locked loop (PLL) or other phase of delay locking circuit suitable for generating the desired phase differences between clocks signals 208a-d. Additionally, clock generator 206 may include an oscillator circuit configured to generate an initial clock signal for use the PLL or other phase locking circuits. In some embodiments, the initial clock signal may be generated external to clock generator 206 and regulator unit 200.

It is noted that the embodiment depicted in FIG. 2 is merely an example. In other embodiments, different functional units, and different arrangements of functional units are possible and contemplated.

Figure 3:
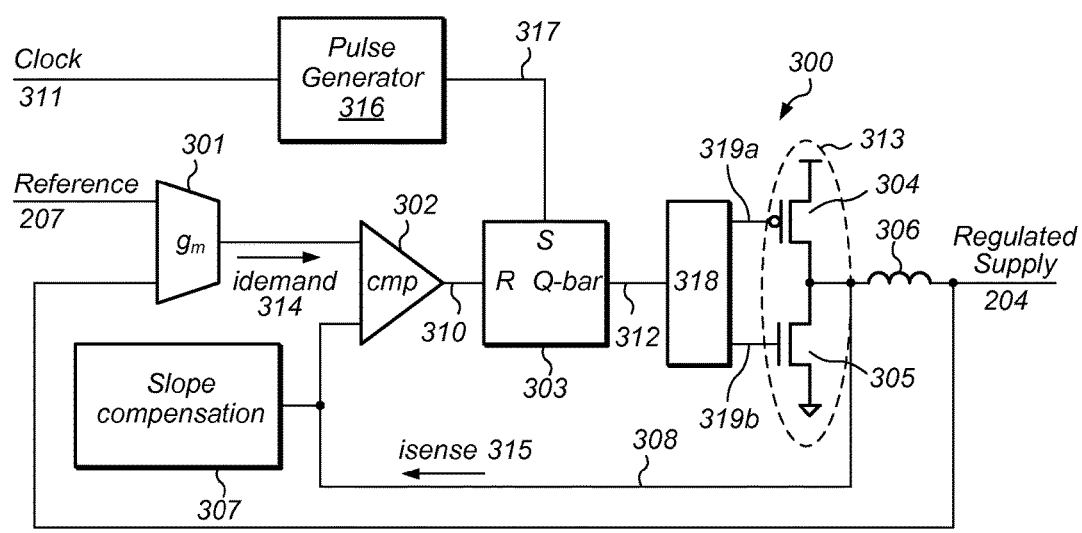
FIG. 3 illustrates an embodiment of a phase unit of a regulator unit.

An embodiment of a phase unit is illustrated in FIG. 3. In various embodiments, phase unit 300 may correspond to a given one of phase units 201a-d as illustrated in FIG. 2. In the illustrated embodiment, phase unit 300 includes transconductance amplifier 301, slope compensation unit 307, comparator 302, latch 303, driver circuit 313, pulse generator 316, pre-driver 318, and inductor 306.

Transconductance amplifier 301 may be configured to convert a difference between reference voltage 207 and regulated supply 204 to idemand current 314. In general, a value of idemand current 314 may be proportional to a difference between reference voltage 207 and regulated supply 204. In some embodiments, transconductance amplifier 301 is operated without negative feedback, i.e., is may be operated "open loop." A value of a resistive load coupled to the output of transconductance amplifier 301 may be chosen to the output of transconductance amplifier 301 from saturating when the difference between reference voltage 207 and regulated supply 204 is large.

Slope compensation unit 307 may be configured to generate a signal as input to comparator 302 whose value determines a value of the ramp on signal 312 output from latch 303. In various embodiments, slope compensation unit 307 may generate the signal as a function of isense current 315 in order to improve stability of phase unit 300.

Comparator 302 may be configured to generate output signal 310 dependent upon a difference between idemand current 314 and isense current 315 (with compensation). In various embodiments, a voltage level of output signal 310 may be proportional to the difference between the values of the two aforementioned current values. In other embodiments, comparator 302 may generate a digital signal whose logic low level corresponds to a ground potential and whose logic high level corresponds to a voltage level sufficient to enable a n-channel metal-oxide field-effect transistor (MOSFET).

In some embodiments, Pulse generator 316 may be configured to generate one or more pulses on signal 317 dependent upon clock 311. Pulse generator may, in various embodiments, includes delay circuits, and logic gates arranged to generate pulses from either one or the other of rising or falling edges of clock 311. It is noted that, in various embodiments, clock 311 may correspond to any of clocks 208a-d as depicted in FIG. 2.

Latch circuit 303 may, in various embodiments, correspond to a specific embodiment of a single data bit storage cell, and may be designed in accordance with one of varying design styles, including, but not limited to, both static and dynamic implementations. In the illustrated embodiment, the complementary output of latch 303, denoted as Q-bar, may be set to a low logic value in response to the assertion of a particular pulse occurring on signal 317. Latch 303 may be reset, i.e., output Q-bar set to a high logic level, in response to the assertion of signal 310 output from comparator 302.

In some embodiments, pre-driver circuit 318 may include circuitry configured to generate control signals 319a and 319b, coupled to transistors 304 and 305, respectively. In response to changes in the logic level on node 312, pre-driver 318 may independently assert and de-assert control signals 319a and 319b. In some embodiments, an asserted one of control signals 319a and 318b may be de-asserted prior to assertion of the de-asserted control signal. By independently asserting and de-asserting control signals 319a and 319b, current flow from the power supply to ground through the driver (commonly referred to as "shoot through" current) may be reduced in various embodiments.

Driver circuit 313 may, in various embodiments, includes transistor 304 and transistor 305. In some embodiments, transistor 304 may correspond to a p-channel MOSFET, and may be configured to source current to node 308 in response to a low logic level on control signal 319a. Transistor 305 may, in various embodiments, correspond to an n-channel MOSFET, and may be configured to sink current from node 308 in response to a high logic level on control signal 319b. It is noted that although driver circuit 313 is depicted as using MOSFETs, in other embodiments, any suitable transconductance device may be employed.

Inductor 306 may be implemented in accordance with one of various design styles. In some embodiments, inductor 306 may be fabricated on an integrated circuit included in a computing system, such as, computing system 100 as illustrated in FIG. 1, using a semiconductor manufacturing process. In other embodiments, inductor 306 may be a discrete circuit element that may be attached to a circuit board, substrate, or semiconductor package.

It is noted that the embodiment of the capacitor model illustrated in FIG. 3 is merely an example. In other embodiments, different circuit elements and different configurations of circuit elements may be employed.

Figure 4:
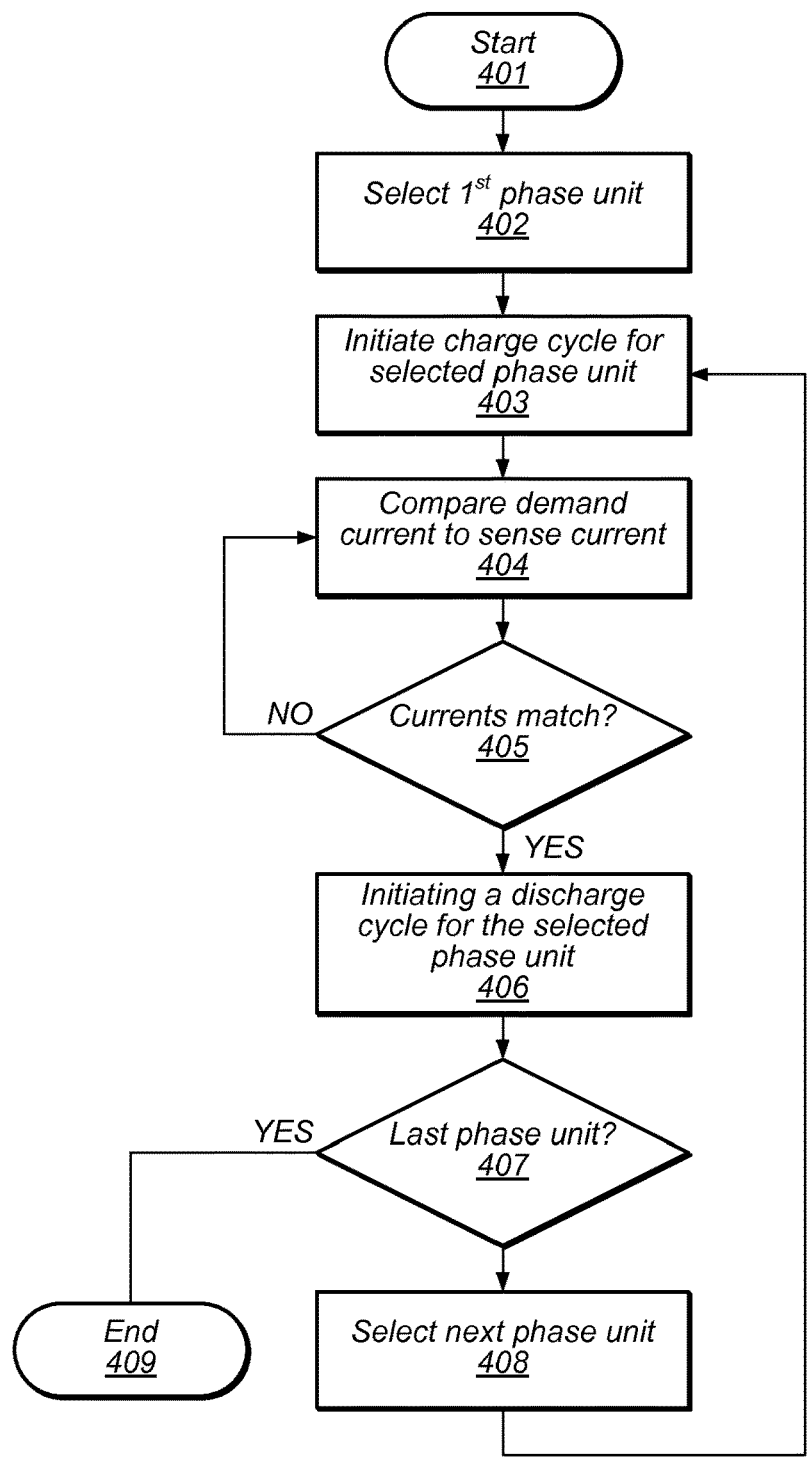
FIG. 4 depicts a flow diagram illustrating an embodiment of a method for operating a regulator unit.

Turning to FIG. 4, a flow diagram depicting an embodiment of a method for operating a voltage regulator is illustrated. Referring collectively to voltage regulator 200 as illustrated in FIG. 2, and the flow diagram of FIG. 4, the method begins in block 401. One of phase units 201a-d may then be selected (block 402). In various embodiments, each of clock signals 208a-d may have a different phase. For example, each of clocks signals 208a-d may be separated a 90-degree phase angle. When a particular clock signal of clock signals 208a-d is asserted, a corresponding phase unit may be selected for activation.

Once a particular phase unit is selected, a charge cycle may be initiated by enabling a pull-up transistor, such as, e.g., transistor 304 of driver 313 as illustrated in FIG. 3, in order to source current to an inductor (block 403). In some embodiments, a latch, such as, e.g., latch 303 of FIG. 3, may be set to in response to the assertion of one of clocks signals 208a-d. In response to the assertion of the clock signal, the output of the latch may transition to a logic level necessary to enable the pull-up transistor, or other suitable device, within the driver circuit, allowing the driver circuit to source current to regulated supply 204.

With the pull-up transistor enabled, a demand current and source current may then be compared (block 404). In some embodiments, a transconductance amplifier, included in the selected phase unit, such as, e.g., transconductance amplifier 301 as illustrated in FIG. 3, may generate the demand current dependent upon regulated supply 204 and reference voltage 207. Comparator 302 may then compare the demand current with a source current measure at the output of the driver circuit, such as, node 308 of FIG. 3, for example.

The method may then depend on the results of the comparison of the demand current and the source current (block 405). In some embodiments, if the demand current and source current are not equal, then the method may proceed from block 404 as described above. Alternatively, if the demand current and the source current are equal, a discharge cycle may then be initiated by enabling a pull-down transistor, such as, e.g., transistor 305 of driver 313 as illustrated in FIG. 3 (block 406). The pull-up transistor may, in some embodiments, be disabled prior to the pull-down transistor being enabled. In various embodiments, a comparator, such as, e.g., comparator 302 of FIG. 3, may generate a signal that resets a latch, such as, e.g., latch 303. When the latch is reset, a pre-driver circuit may disable the pull-up transistor, thereby preventing further current from being sourced to regulated supply 204. In some embodiments, the pull-down transistor may sink current from regulated supply 204 while enabled.

The method may then depend on which phase unit is selected (block 407). If the currently selected phase unit is a last phase unit of the phase units included in the regulator unit, then the method may conclude in block 409. If, however, the selected phase unit is not the last phase unit, than a next phase unit will be selected (block 408). In various embodiments, a different clock signal of clock signals 208a-d may be asserted, selecting a new phase unit of phase units 201a-d. Once the new phase unit has been selected, the method may proceed from block 403 as described above. It is noted that the method described in flow diagram of FIG. 4 may be executed repeatedly during operation of a computing system to provide a regulated supply voltage to the components of the computing system.

Although the operations illustrated in the flow diagram of FIG. 4 are depicted as being performed in a serial fashion, it is noted that, in other embodiments, one or more of the operations may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a first phase unit including a first transconductance amplifier and a first inductor coupled to a regulated supply voltage node, wherein the first phase unit is configured to:
   source, via the first inductor, a first current to the regulated supply voltage node using a common power supply signal, wherein the first current is sourced in response to setting a first latch using a first pulse signal generated using a first clock signal;
   generate, using the first transconductance amplifier, a first demand current using a reference voltage and a voltage level of the regulated supply voltage node; and
   halt sourcing the first current using a first result of a first comparison between a compensated version of the first current and the first demand current; and
   a second phase unit including a second transconductance amplifier and a second inductor coupled to the regulated supply voltage node, wherein the second phase unit is configured to:
   source, via the second inductor, a second current to the regulated supply voltage node using the common power supply signal, wherein the second current is sourced in response to setting a second latch using a second pulse signal generated using a second clock signal;

generate, using the second transconductance amplifier and independent of the first demand current, a second demand current using the reference voltage and the voltage level of the regulated supply voltage node; and halt sourcing of the second current using a second result of a second comparison between a compensated version of the second current and the second demand current;

wherein the first demand current used in the first comparison to halt sourcing of the first current does not have a contribution from the second demand current; and wherein the second demand current used in the second comparison to halt sourcing of the second current does not have a contribution from the first demand current.

2. The apparatus of claim 1, wherein the first phase unit includes a first driver circuit including at least one n-channel metal-oxide semiconductor field-effect transistor (MOSFET) and at least one p-channel MOSFET, wherein to source the first current to the first inductor, the first phase unit is further configured to activate the at least one p-channel MOSFET, and wherein the first phase unit is further configured to activate the at least one n-channel metal-oxide semiconductor field-effect transistor using the first result.

3. The apparatus of claim 1, wherein a phase of the first clock signal is different than a phase of the second clock signal.

4. The apparatus of claim 1, further comprising a reference generator unit configured to generate the reference voltage.

5. The apparatus of claim 1, further comprising a clock generator unit configured to generate the first clock signal and the second clock signal using a system clock signal.

6. A method for operating a voltage regulator unit, the method comprising:
    initiating a first charge cycle of a first phase unit of a plurality of phase units in response to setting a first latch using a first pulse signal generated using a first clock signal of a plurality of clock signals;
    initiating a second charge cycle of a second phase unit of the plurality of phase units in response to setting a second latch using a second pulse signal generated using a second clock signal of the plurality of clock signals;
    sourcing, via a first inductor and using a common power supply signal, a first current to a load circuit by the first phase unit during the first charge cycle of the first phase unit;
    sourcing, via a second inductor and using the common power supply signal, a second current to the load circuit by the second phase unit during the second charge cycle of the second phase unit;
    halting the first charge cycle of the first phase unit using a first result of a first comparison between a first demand current and a compensated version of the first current, wherein the first demand current is generated using a voltage level at an output of the voltage regulation unit and a reference voltage level; and
    halting the second charge cycle of the second phase unit using a second result of a second comparison between a second demand current and a compensated version of the second current, wherein the second demand current is generated using the voltage level at the output of the voltage regulation unit and the reference voltage level;
    wherein the first demand current used in the first comparison to halt sourcing of the first current does not have a contribution from the second demand current; and
    wherein the second demand current used in the second comparison to halt sourcing of the second current does not have a contribution from the first demand current.

7. The method of claim 6, wherein an assertion of the second clock signal occurs after a predetermined period of time has elapsed since an assertion of the first clock signal.

8. The method of claim 6, wherein a value of the first demand current is proportional to a difference between the voltage level at the output of the voltage regulator unit and the reference voltage level.

9. The method of claim 6, wherein halting the first charge cycle includes resetting the first latch using the first result.

10. The method of claim 6, wherein the plurality of phase units is included in a common integrated circuit package.

11. An apparatus, comprising:
    a first phase unit including a first inductor that is coupled to a regulated supply signal, wherein the first phase unit is configured to:
        source, in response to setting a first latch and using a common input power supply, a first current to the regulated supply signal via the first inductor, wherein the first latch is set using a first pulse signal generated using a first clock signal; and
        halt sourcing the first current based on a first comparison of a compensated version of the first current and a first demand current, wherein the first demand current is generated using a voltage level of the regulated supply signal and a reference voltage level; and
    a second phase unit including a second inductor that is coupled to the regulated supply signal, wherein the second phase unit is configured to:
        source, in response to setting a second latch and using the common input power supply, a second current to the regulator supply signal via the second inductor, wherein the second latch is set using a second pulse signal generated using a second clock signal; and
        halt sourcing the second current based on a second comparison of a compensated version of the second current and a second demand current, wherein the second demand current is generated using the voltage level of the regulated supply signal and the reference voltage level;
    wherein the first demand current used in the first comparison to halt sourcing of the first current does not have a contribution from the second demand current; and
    wherein the second demand current used in the second comparison to halt sourcing of the second current does not have a contribution from the first demand current.

12. The apparatus of claim 11, wherein to source the first current, the first phase unit is further configured to enable a transistor coupled between the common input power supply and the first inductor.

13. The apparatus of claim 11, wherein each of the first and second phase units are included in a common integrated circuit package.

14. The apparatus of claim 11, wherein each of the first and second phase units are included on a single integrated circuit.

15. The apparatus of claim 11, further comprising a reference generator configured to generate the reference voltage level.

16. The apparatus of claim 11, wherein the second clock signal lags the first clock signal.

17. The apparatus of claim 11, further comprising a clock generator unit configured to generate the first and second clock signals.

* * * * *